United States Patent
Shonting et al.

[19]

[11] Patent Number: 5,970,779
[45] Date of Patent: Oct. 26, 1999

[54] SYSTEM AND METHOD FOR CALIBRATING ACCELEROMETER OVER LOW (OCEAN WAVE) FREQUENCIES

[75] Inventors: David H. Shonting, Middletown, R.I.; Peter R. Hebda, Rehoboth, Mass.; Foster H. Middleton, Wakefield, R.I.

[73] Assignee: The United States of America as represented by the Secretary of the Navy, Washington, D.C.

[21] Appl. No.: 08/935,310

[22] Filed: Sep. 15, 1997

[51] Int. Cl.⁶ .................................................. G01P 21/00
[52] U.S. Cl. ................................................................ 73/1.39
[58] Field of Search .................................... 73/1.37–1.39, 73/1.41

[56] References Cited

U.S. PATENT DOCUMENTS

| | | | |
|---|---|---|---|
| 2,770,126 | 11/1956 | Brown | 73/1.39 |
| 3,429,175 | 2/1969 | Real, Jr. et al. | 73/1.38 |
| 5,203,199 | 4/1993 | Henderson et al. | 73/1.39 |
| 5,644,067 | 7/1997 | Gabrielson | 73/1.39 |

FOREIGN PATENT DOCUMENTS

| 1569729 | 6/1990 | U.S.S.R. | 73/1.39 |
|---|---|---|---|

*Primary Examiner*—Robert Raevis
*Attorney, Agent, or Firm*—Michael J. McGowan; Michael F Oglo; Prithvi C. Lall

[57] ABSTRACT

An accelerometer calibration system calibrates an accelerometer for use in, for example, an ocean wave environment in which the accelerometer will undergo generally oscillatory acceleration. The accelerometer calibration system includes an simple harmonic motion ("SHM")-derived accelerator and a processor. The SHM-derived accelerator applies an SHM acceleration to the accelerometer. The accelerometer generates an output signal having an amplitude related to the acceleration applied thereto. The processor controls the SHM-derived accelerator to apply selected accelerations to the accelerometer, receives the output signal from the accelerometer and generates a profile relating the accelerations applied by the sinusoidal acceleration means to the amplitude of the output signal. The SHM-derived accelerator applies the SHM acceleration by rotating the accelerometer around a center of rotation, so that the acceleration applied to the accelerometer is a function of the distance of the accelerometer from the center of rotation and the period of rotation. This enables the acceleration to be determined without any need for a reference or control instrument.

7 Claims, 1 Drawing Sheet

SYSTEM AND METHOD FOR CALIBRATING ACCELEROMETER OVER LOW (OCEAN WAVE) FREQUENCIES

STATEMENT OF GOVERNMENT INTEREST

The invention described herein may be manufactured by or for the Government of the United States of America for Governmental purposes without the payment of any royalties thereon or therefor.

BACKGROUND OF THE INVENTION

(1) Field of the Invention

The invention relates generally to the field of calibration of instruments, and more particularly to systems and methods for calibrating accelerometers for use in connection with wave measurements in, for example, an ocean environment.

(2) Description of the Prior Art

An accelerometer generates an output signal which has an amplitude which is related to the acceleration that is applied to the accelerometer. It is often necessary to calibrate the accelerometer, that is, to determine the amplitude of its output signal as a function of the magnitude of the applied acceleration (the accelerometer's "signal profile") and of its frequency. If the accelerometer is used in an ocean environment, the accelerometer may undergo a generally oscillatory, sinusoidal-like vertical acceleration due to wave action. By determining the vertical acceleration a wave may apply to the accelerometer, the wave's amplitude statistics may be determined, which may, in turn, provide information as to the wind and other weather conditions.

Prior systems for calibrating accelerometers relied on comparisons of the accelerometers to certain standard devices. Such systems assumed that the standards themselves were properly calibrated and, in any case, the comparisons themselves could introduce additional error into the calibration of the accelerometers undergoing calibration.

SUMMARY OF THE INVENTION

It is therefore an object of the invention to provide a new and improved system and method for calibrating accelerometers for use in connection with wave measurements in, for example, an ocean environment.

Another object is to provide a system and method for calibrating accelerometer for use in connection with wave measurements based upon measured parameters within the system itself (so-called "absolute method" of calibration) instead of using a reference instrument.

In brief summary, the invention provides an accelerometer calibration system that calibrates an accelerometer for use in an environment in which the accelerometer will undergo wavelike vertical acceleration and which serves to generate an output signal having an amplitude and frequency directly related to acceleration applied to the accelerometer. An example of such as use of an accelerometer is disclosed in co-pending, commonly-assigned patent application Ser. No. 08/581,183, filed Jan. 16, 1996, entitled "Submarine Deployed Sea-State Sensor" (Navy Case 75829) hereby incorporated by reference in its entirety.

The accelerometer calibration system includes means for applying simple harmonic motion ("SHM")-derived acceleration to the accelerometer undergoing calibration, and a multi-function processor system which serves to control the ultimate causal SHM, to process the output signal from the accelerometer, and to generate a strip-chart trace profile relating the acceleration applied to the accelerometer to the amplitude and frequency of the output signal.

The physical structure of the system includes a swing arm whose rotation provides the ultimate causal SHM and whose rate of rotation is under the control of the multi-function processor system. This physical system makes it possible for two measurable parameters to be had which facilitate operation of the system in an absolute method of calibration mode, that is, without need for a reference instrument. The two parameters which facilitate this are the rate of rotation of the swing arm and the radius of rotation of the swing arm.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
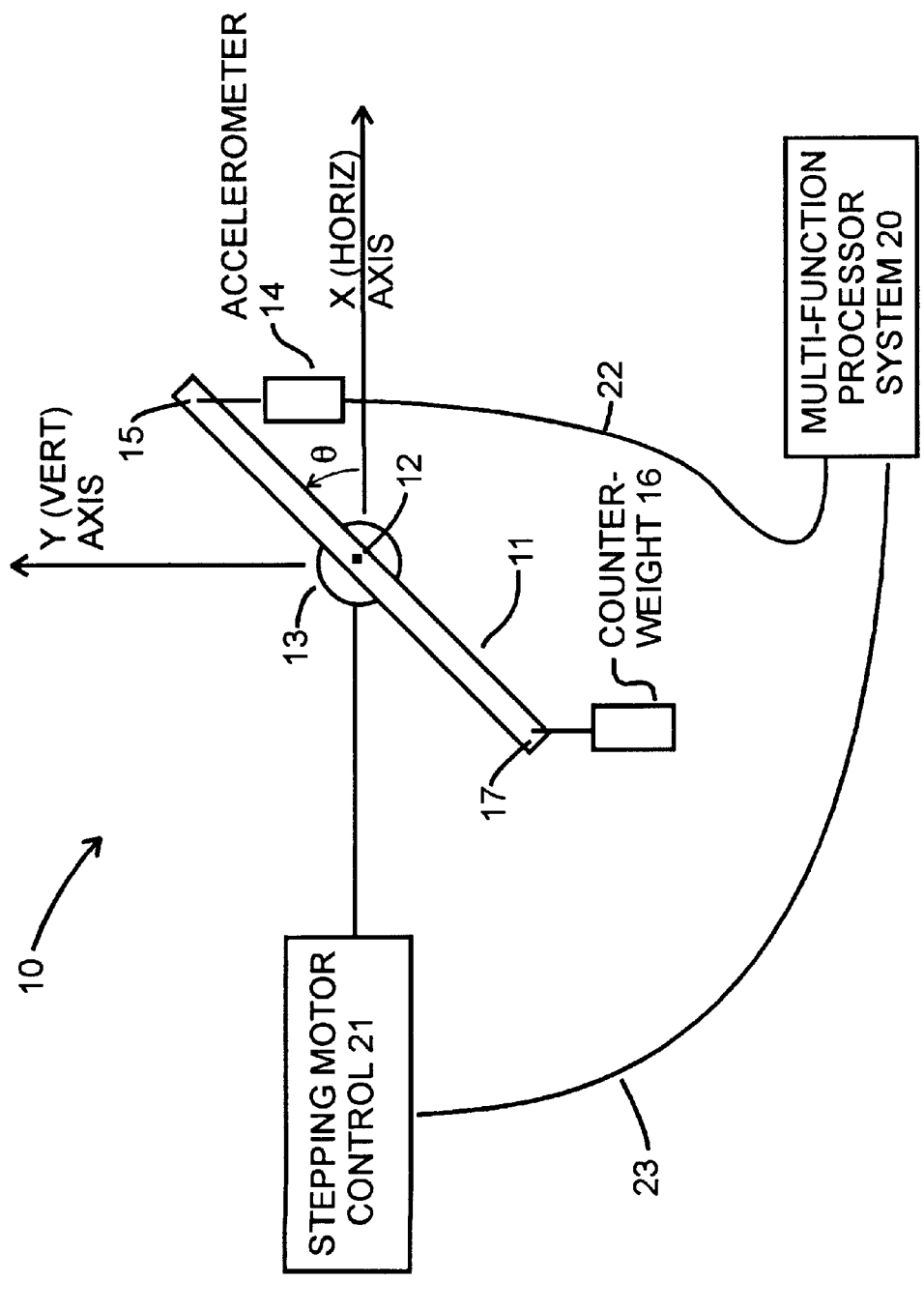
FIG. 1 schematically depicts a system for calibrating an accelerometer constructed in accordance with the invention.

FIG. 1 schematically depicts a system 10 for calibrating an accelerometer constructed in accordance with the invention. By way of background, an accelerometer generates an output signal which has an amplitude which is related to the acceleration that is sensed by the accelerometer. The system and method is intended to calibrate the accelerometer, that is, to determine the amplitude of its output signal as a function of the applied acceleration (termed hereinafter the accelerometer's signal profile), for use in an ocean environment, in which the accelerometer may undergo a generally oscillatory sinusoidal-like vertical acceleration due to wave action. By determining the vertical acceleration a wave may apply to the accelerometer, the wave's amplitude and spectral statistics may be determined, which may, in turn, provide information as to the wind speed.

With reference to FIG. 1, the system 10 includes an elongated beam 11 which is rotated about its center point 12 by a stepping motor 13. In one embodiment, the elongated beam has a length of 100 cm. At one end of the beam 11, an accelerometer 14 is hung by a low-friction pin 15, and a counterweight 16 is mounted on the other end of the beam 11. The two halves of the beam form diametrically-opposed arms. The counterweight 16, which is preferably equivalent in mass to the accelerometer 14, is preferably hung on the beam 11 by a low-friction pin 17, or it may be mounted on the beam by any convenient mounting arrangement. Rotation of the beam is under control of a stepping motor control 21 which provides interfacing with a flexibly programmed computer. Motor 13 and motor control 21 may alternatively be of any suitable type which provides a selective rate of rotation under control of a processor.

A multi-function processing system 20 provides an output signal over line 23 which is coupled to the stepping motor control 21 and receives data signals over line 22 from accelerometer 14. Stepping motor control 21 controls the rotational speed of motor 13 in response to the signal received from processor system 20. The data signals coupled to processor system 20 from accelerometer 14 is the output of the accelerometer in response to the acceleration applied to it. As described below, the processor system 20 generates the accelerometer's profile on the basis of the amplitudes of the signal from accelerometer 14, the rotational speed at which the processor system 20 causes (via motor control 21)

the beam 11 to rotate and the radius of rotation, which corresponds to one-half the length of beam 11. The portion of beam 11 between its center point 12 and pin 15 effectively forms a swing arm.

The processing system 20 may also include output devices such as printers, strip-chart recorders, monitoring oscilloscopes and the like which depict the accelerometer's output signal. Processor system 20 may be embedded in the form of a flexibly-programmable general purpose digital computer programmed to perform the functions described herein using conventional and well-known software programming techniques.

As noted above, the stepping motor control 21, under control of the processing system 20, can control the acceleration on the accelerometer 14 by controlling the rotational speed (that is, the angular velocity) at which the beam 11 is rotated by the stepping motor 13 and the radius of rotation as provided by the beam 11. In that operation, it will be appreciated that the tangential (circumferential) velocity, $V_T$, of the accelerometer 14 provided by the beam 11 is $$V_T = \frac{2\pi r}{T} \tag{1}$$

where "r" is the radius of rotation provided by the beam 11 (which corresponds to the distance along the swing arm from the center of rotation at center point 12 to the pin 15 from which the accelerometer is suspended) and "T" is the rotational period of the beam 11. The component of the velocity along the vertical ("Y") axis, $V_Y$, is given by $$V_y = V_T \cos\theta, \text{ where } \theta = \left(\frac{2\pi}{T}\right)t \tag{2}$$

where "t" is time and the angle "θ" is measured from the horizontal ("X") axis. Since the vertical component of acceleration is the derivative, with respect to time, of the vertical component of velocity, the vertical component of acceleration, $A_Y$, is given by $$A_y = \frac{dV_y}{dt} = \left(\frac{-4\pi^2 r}{T^2}\right)\sin\left(\frac{2\pi}{T}\right)t. \tag{3}$$

Since the maximum negative and positive accelerations will occur when the beam 11 is directed vertically which will occur at times t=T/4 and t=3T/4 (assuming that the beam 11 is horizontal at time t=0). At these two positions, the magnitude of acceleration from (3) is $$|A| = \frac{4\pi^2 r}{T^2}. \tag{4}$$

Accordingly, the value of the acceleration maxima is merely a function of the radius and rotational period. Thus, an important feature of the calibration system described herein is that the acceleration, which is given by (4) is only related to "r" and "T," in which case the system provides absolute accelerations, eliminating any need for use of standard instruments for comparison.

Using equation (4), the sensitivity of the accelerometer 14 in signal amplitude $A_{PP}$ (the so-called peak-to-peak signal amplitude, or difference between the maximum and minimum signal amplitude) to per unit of acceleration "g" (9.8 m/sec²) is $$\text{Sensitivity} = \frac{A_{PP}}{2}\left(\frac{T^2 \text{ (sec}^2)}{4\pi^2 r \text{ (cm)}}\right)\left(\frac{980 \text{ (cm/sec}^2)}{1 \text{ (g)}}\right). \tag{5}$$

Using equation 5, the processing system 20 can relate the amplitude of the signal from the accelerometer 14 to a sensitivity curve as a function of the frequency of rotation of the beam 11.

It should be noted that the system and method are of primary utility at low rotation frequencies, such as those exhibited by ocean waves. At high rotation frequencies, however, the centripetal acceleration vector (along the direction of the beam 11) tends to increase causing the accelerometer 14 to sway from the vertical, which can introduce error into the measurements.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. An accelerometer calibration system for calibrating an accelerometer for use in an environment in which the accelerometer will undergo generally oscillatory acceleration along an axis comprising:

a simple harmonic motion ("SHM") accelerator for applying a simple harmonic motion ("SHM") acceleration to the accelerometer along said axis, the accelerometer generating an output signal having an amplitude related to the acceleration applied to said accelerometer;

a processor for receiving the output signal from the accelerometer and generating a profile relating the acceleration applied by the SHM accelerator to the amplitude of the output signal, said processor further controlling the SHM accelerator to enable application of selected accelerations to the accelerometer;

said SHM accelerator including a swing arm having an end, the accelerometer being suspended from the end of the swing arm; and said SHM accelerator further including a controllable motor for rotating the swing arm to thereby provide an SHM-derived acceleration to said swing arm, the motor being controlled by said processor to rotate the swing arm at selected angular velocities thereby to selectively vary the SHM-derived acceleration to the accelerometer.

2. An accelerometer calibration system as defined in claim 1 in which the swing arm comprises a portion of a beam having a center of rotation, the motor rotating the beam around the center of rotation, the beam having an end opposing the end of the swing arm, the system further including a counterweight suspended from the bar's opposing end.

3. An accelerometer calibration system as defined in claim 1 in which the processor generates the profile as a sensitivity value corresponding to $$\text{Sensitivity} = \frac{A_{PP}}{2}\left(\frac{T^2 \text{ (sec}^2\text{)}}{4\pi^2 r \text{ (cm)}}\right)\left(\frac{980 \text{ (cm/sec}^2\text{)}}{1 \text{ (g)}}\right)$$

where "$A_{PP}$" is a peak-to-peak range of magnitude of the signal from the accelerometer, "T" is the period of rotation of the swing arm, and "r" is the distance along the swing arm from a point around which the swing arm is rotated to a point from which the accelerometer is suspended.

4. An accelerometer calibration system as defined in claim 1 in which the motor is a stepping motor adapted to step the rotation of the swing arm at a stepping rate in response to a control signal from the processor.

5. A method for calibrating an accelerometer for use in an environment in which the accelerometer will undergo generally oscillatory acceleration along an axis comprising the steps of:

applying a simple harmonic motion ("SHM")-derived acceleration to the accelerometer thereby to enable the accelerometer to generate an output signal having an amplitude related to the acceleration applied to said accelerometer, said SHM-derived acceleration being controllably variable;

receiving the output signal from the accelerometer;

generating a profile relating the acceleration applied to the accelerometer to the amplitude of the output signal;

said SHM-derived acceleration application step comprising a step of suspending the accelerometer from one end of a swing arm; and said SHM-derived acceleration application step comprising a further step of rotating the swing arm thereby to provide the SHM-derived acceleration to said swing arm, the rate of rotation being controllable to rotate the swing arm at selected angular frequencies thereby to apply controllably variable SHM-derived acceleration to the accelerometer.

6. A method as defined in claim 5 in which the swing arm comprises part of a beam which is rotated about a center of rotation, the beam having an end opposing the end of the swing arm and a counterweight being suspended from the beam's opposing end.

7. A method as defined in claim 5 in which the profile is generated as a sensitivity value corresponding to $$\text{Sensitivity} = \frac{A_{PP}}{2}\left(\frac{T^2 \text{ (sec}^2\text{)}}{4\pi^2 r \text{ (cm)}}\right)\left(\frac{980 \text{ (cm/sec}^2\text{)}}{1 \text{ (g)}}\right)$$

where "$A_{PP}$" is a peak-to-peak range of magnitude of the signal from the accelerometer, "T" is the period of rotation of the swing arm, and "r" is the distance along the swing arm from a point around which the beam is rotated to a point from which the accelerometer is suspended.

* * * * *